Figure 13:
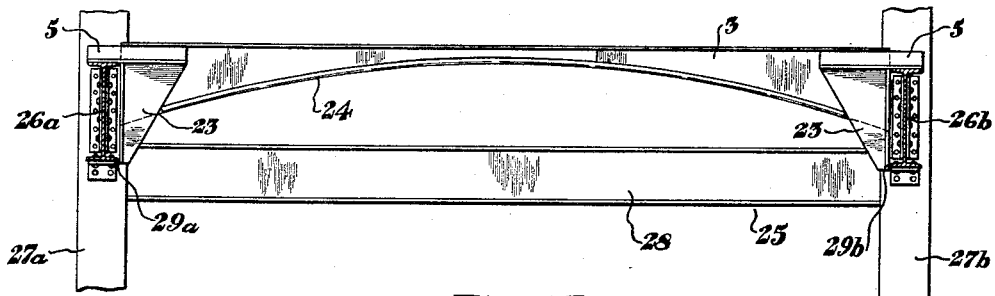

Feb. 2, 1932. H. F. FREASE 1,843,318
ARCH AND BEAM MANUFACTURE AND PRODUCTS
Filed May 25, 1928 5 Sheets-Sheet 1
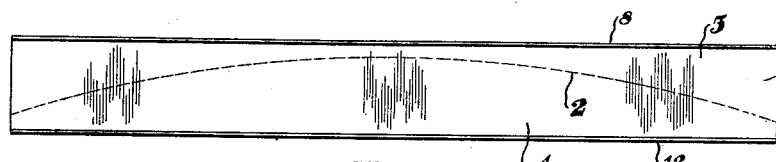 
Fig.1  Fig.2
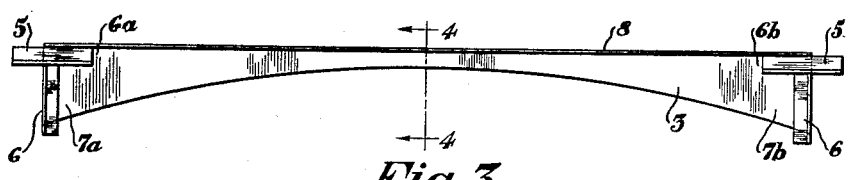 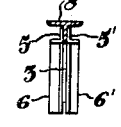
Fig.3  Fig.4
 
Fig.5  Fig.6
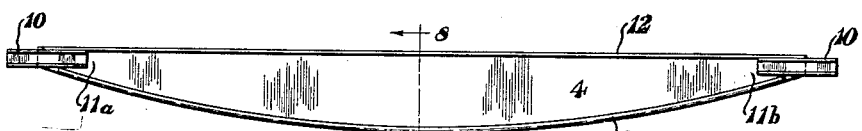 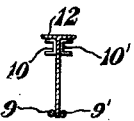
Fig.7  Fig.8
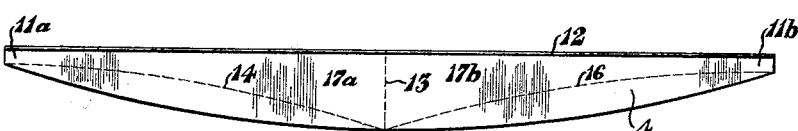 
Fig.9  Fig.10
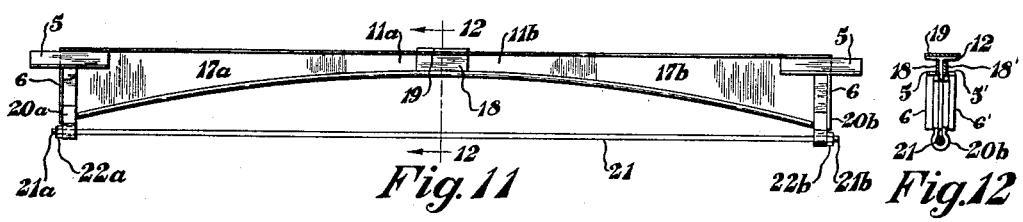 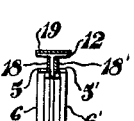
Fig.11  Fig.12
Inventor
H. F. Frease
By Harry Frease
Attorney Inventor
H. F. Frease
By Harry Frease
Attorney

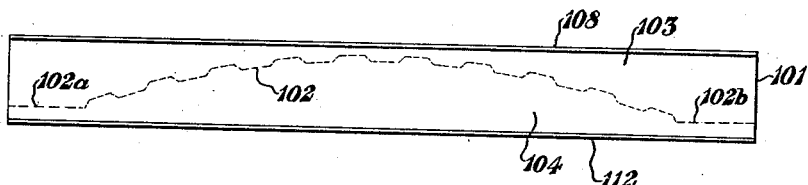 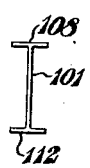
Fig. 17    Fig. 18
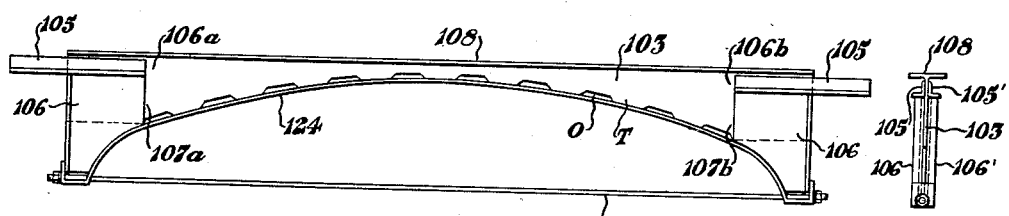 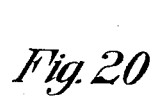
Fig. 19    Fig. 20
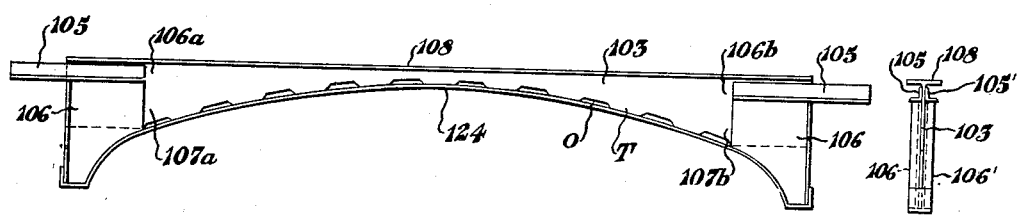 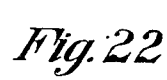
Fig. 21    Fig. 22
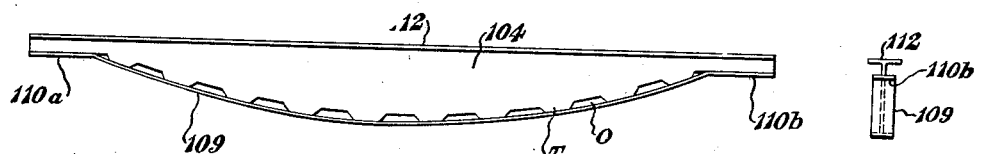 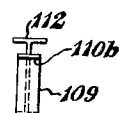
Fig. 23    Fig. 24
Inventor
H. F. Frease
By Harry Frease
Attorney Feb. 2, 1932.  H. F. FREASE  1,843,318
ARCH AND BEAM MANUFACTURE AND PRODUCTS
Filed May 25, 1928    5 Sheets-Sheet 5

Inventor
H. F. Frease
By Harry Frease
Attorney

Patented Feb. 2, 1932

1,843,318

UNITED STATES PATENT OFFICE

HURXTHAL F. FREASE, OF CANTON, OHIO

ARCH AND BEAM MANUFACTURE AND PRODUCTS

Application filed May 25, 1928. Serial No. 280,484.

My invention relates to arch and beam structures and structural members for supporting transverse loads, and to the manufacture thereof, and more particularly to improvements in the arch structures and structural members set forth in my prior application for patent, filed March 15, 1926, Serial No. 94,757, and in the methods of manufacturing the same.

In the aforesaid prior application, there is disclosed an arch having outer bases, means for resisting the end thrust of the outer bases, and end supports on the arch extending outwardly and longitudinally therefrom, and spaced transversely from the thrust resisting means. The particular thrust resisting means illustrated in said application consists of a tie rod connecting the outer bases of the arch.

The objects of the present improvements include the provision of novel thrust resisting means for the arches of said prior application.

Further objects of the present improvements include the provision of more efficient and more economical methods of manufacturing arches, and beams having non-uniform cross section.

Further objects of the present improvements include the provision of novel and more efficient arrangements of arches with the structural frame work of buildings.

Further objects of the present improvements include the provision of arches and beams adapted for easier fabrication by welding, and at the same time adapted for easier installation as floor joists carrying metal lath or the like, than have heretofor been available.

These and ancillary objects are attained in the present invention by the arches and beams and the methods of manufacturing hereinafter set forth in detail, and claimed herein, and in divisional applications hereof.

Preferred embodiments of the present improvements, together with the method of manufacturing the same, are illustrated in the accompanying drawings forming part hereof, in which Figure 1 is an elevation view of a standard structural shape illustrating one step in the improved method of manufacturing arches and beams including certain of the improved arches and beams hereof.

Figure 14:
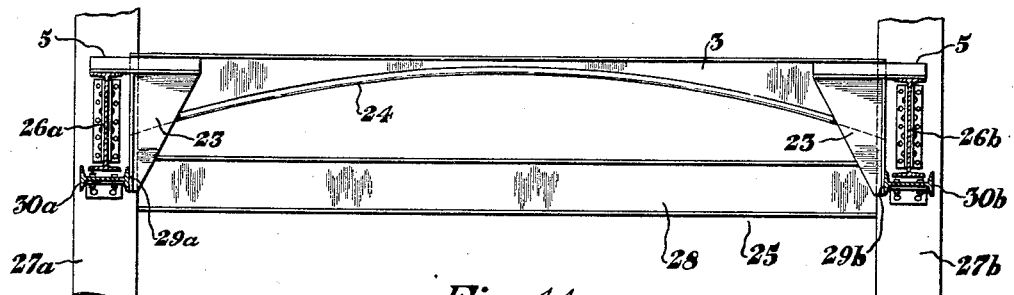
Figure 15:
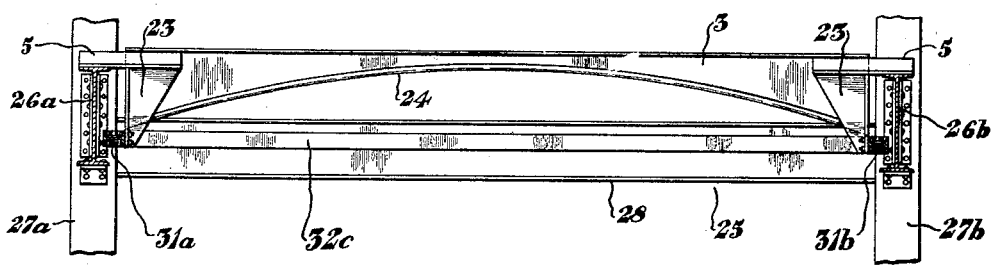
Figure 16:
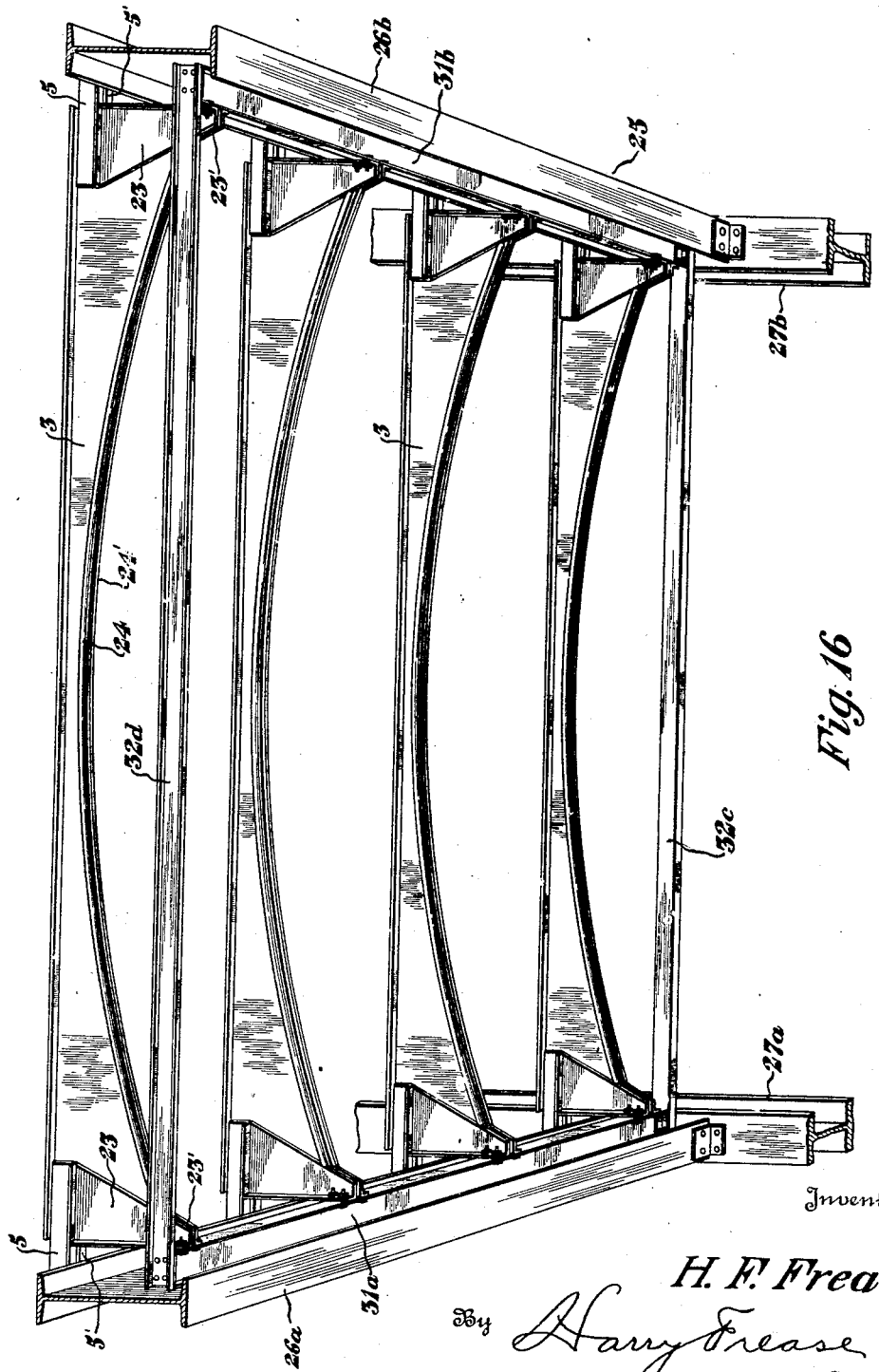
Figure 25:
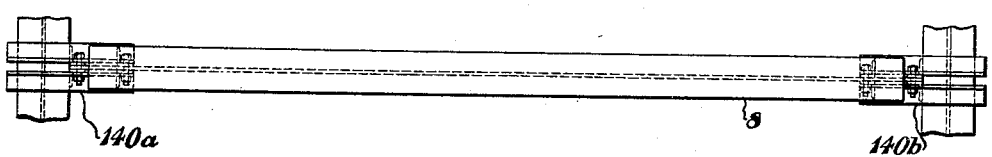
Figure 26:
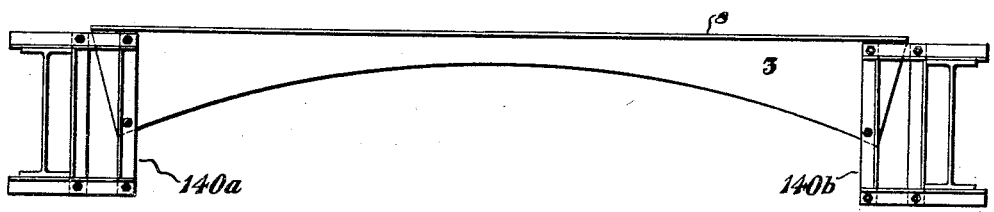
Figure 27:
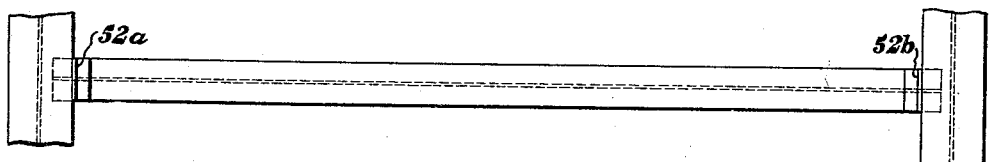
Figure 28:
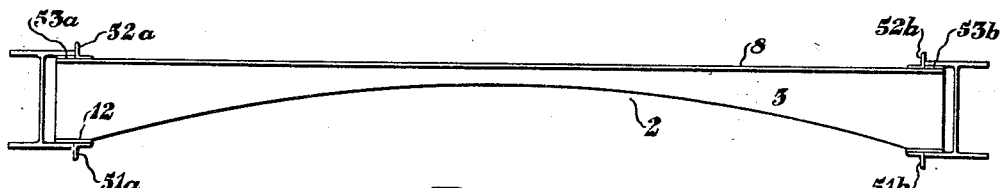

Fig. 2, an end elevation thereof;

Fig. 3, a side elevation illustrating one form of arch made from the structural shape illustrated in Fig. 1;

Fig. 4, a transverse sectional view thereof as on line 4—4, Fig. 3;

Fig. 5, a side elevation illustrating one form of beam having non-uniform cross section made from the standard structural shape illustrated in Fig. 1;

Fig. 6, an end elevation thereof;

Fig. 7, a side elevation of another form of beam similar to that illustrated in Fig. 5 and made therefrom;

Fig. 8, a transverse sectional view thereof as on line 8—8, Fig. 7;

Fig. 9, a side elevation of a beam similar to that shown in Fig. 5, and illustrating the method of manufacturing an arch therefrom;

Fig. 10, an end elevation thereof;

Fig. 11, a side elevation illustrating the arch made from the beam illustrated in Fig. 9;

Fig. 12; a transverse sectional view thereof as on line 12—12, Fig. 11;

Fig. 13, a side elevation of a modified form of the arch shown in Fig. 3, in novel arrangement with the main structural frame of a building illustrated partly in section and partly in fragmentary elevation;

Fig. 14, a view similar to Fig. 13 illustrating a modified arrangement thereof;

Fig. 15, a view similar to Figs. 13 and 14, and illustrating a modified arrangement thereof in which no thrust load is transmitted to the main frame of the building;

Fig. 16, a fragmentary perspective view further and more clearly illustrating the arrangement of Fig. 15;

Fig. 17, a side elevation of a standard structural shape similar to that illustrated in Fig. 1 and illustrating one step in the improved method of manufacturing others of the improved arches and beams hereof;

Fig. 18, an end elevation thereof;

Fig. 19, a side elevation illustrating one form of arch made from the structural shape illustrated in Fig. 17;

Fig. 20, an end elevation thereof;

Fig. 21, a side elevation illustrating another form of arch made from the standard structural shape illustrated in Fig. 17;

Fig. 22, an end elevation thereof;

Fig. 23, a side elevation illustrating one form of beam having non-uniform cross section and made from the standard structural shape illustrated in Fig. 17;

Fig. 24, an end elevation thereof;

Fig. 25, a top plan view of another form of the improved arch made according to the improved method hereof, and including improved means for resisting vibrating loads;

Fig. 26, a side elevation thereof;

Fig. 27, a top plan view of a modified form of the improved arch illustrated in Fig. 25; and Fig. 28, a side elevation thereof.

Similar numerals refer to similar parts throughout the drawings.

Figs. 1 to 12 inclusive illustrate one series of improved arches and beams and the improved method of making the same from standard rolled shapes.

The improved method of manufacturing arches and beams includes cutting a standard rolled shape 1, preferably an I beam, preferably to a length equal to or less than the clear distance between the bearings upon which the arch to be made is to be rested.

The web of the I beam is then longitudinally severed by a single preferably curved cut 2 which follows the desired arch line, and the severing may be done by burning, shearing, slitting, or any other well known severing method.

Severing the shaft 1 longitudinally, thus provides an arch 3, and a beam 4.

The arch 3 may be used to make a lever arch of the type set forth in my aforesaid prior application, by securing as by arc welding spaced lever end supports 5 and 5′ which may be angles, at each of the upper outer corners 6a and 6b of the bases 7a and 7b, respectively, of the arch 3, and the angle end supports are preferably located just below the upper flange 8 of the arch 3, and extend longitudinally beyond the ends of the bases any desired distance for resting upon and vertically reacting against the bearings for the arch.

Spaced thrust heel struts 6 and 6′ are secured as by welding at the sides of each of the bases 7a and 7b and may depend downward from the lower outer corners of the arch any desired distance, the thrust heel struts being adapted as will hereinafter be set forth in greater detail, for abutment against any desired resistance against the end thrust of the arch, at any desired distance below the vertically reacting end supports.

The beam 4 made as aforesaid, comprises a T beam of varying cross section having a maximum cross sectional area at the center.

These beams may be used in positions like that illustrated in Fig. 5, for providing curved roof joists for self-draining roofs.

The beam 4 may be used to make a floor joist having a flat upper chord and a curved lower chord, by reversing the position of the beam as illustrated in Fig. 5 to the position illustrated in Fig. 7, and by securing as by arc welding curved lower chord reinforcing bars 9 and 9′ at each side of the curved lower edge of the beam, and by securing as by arc welding spaced lever end supports 10 and 10′ which may be channels, at each of the outer ends 11a and 11b of the beam, the channel end supports being preferably located just below the flange 12 of the beam, and extend longitudinally beyond the ends of the beam any desired distance for resting upon the bearings therefor.

The beam 4 may also be used to make an arch, or a lever arch, by transversely severing the beam at its center by a cut 13 perpendicular to the flange 12, as illustrated in Fig. 9, and by longitudinally severing the web at one end by a curved cut 14 extending between the end 11a and the extremity 15 of the cut 13 at the curved edge of the beam and at the other side by a curved cut 16 extending between the extremity 15 and the other end 11b of the beam 4.

Arch struts 17a and 17b are thus formed, and the ends 11a and 11b, reversed from the position illustrated in Fig. 9, may be joined as illustrated in Figs. 11 and 12, as by means of side plates 18 and 18′ and a top plate 19.

End supports 5 and 5′ and heel struts 6 and 6′ are provided in the same manner as were provided for the arch illustrated in Figs. 3 and 4, and tie rod sleeves 20a and 20b which may be formed from U straps are secured at the lower outer ends of the heel struts. A tie rod 21 is provided with threaded ends 21a and 21b which extend through the sleeves 20a and 20b, respectively, and nuts 22a and 22b are screwed upon the threaded ends 21a and 21b of the tie rod and abut the tie rod sleeves, thus making a lever arch similar to that set forth in my aforesaid prior application.

Accordingly by the improved method of manufacturing arches and beams thus set forth, a single length of rolled shape 1, may be used to make either two arches which may be of either of the types illustrated in Fig. 3 and Fig. 11, or one arch and one beam as illustrated respectively in Figs. 3 or 11, and Figs. 5 or 7.

Figs. 13 to 16 inclusive, illustrate modified forms of the arch shown in Fig. 11, in novel arrangement with the main structure frame of a building, whereby no tie rods are required to extend across the major portion of the ceiling area, thereby reducing the space between floor and ceiling and adapting the lever arch joist construction for use in high buildings.

The lever arches illustrated in Figs. 13 to 16 inclusive, each include an arch 3 made as aforesaid and having secured thereon as aforesaid lever end supports 5 and 5', and modified triangular heel struts 23 and 23', arranged in a manner similar to the arrangement of the heel struts 6 and 6', but being greater in strength by reason of their triangular shape.

Curved lower chord reinforcing bars 24 and 24' may be secured at each side of the lower curved edge of the arch 3.

As illustrated in Fig. 13, the lever arch has been installed upon the main frame of a building indicated generally at 25, and which may include spaced bearing beams 26a and 26b upon the upper surfaces of which the supports 5 rest and vertically re-act.

The bearing beams 26a and 26b may be carried at their ends in a usual manner on columns 27a and 27b respectively, and the columns 27a and 27b are connected as by means of a non-bearing beam 28.

The thrust heel struts 23 and 23' extend downwardly a sufficient distance to abut, as at 29a and 29b respectively, laterally against the inwardly directed edges of the lower flanges of the beams 26a and 26b, thereby providing a resistance against the end thrust of the arch at a distance below the vertically reacting end supports equal to the distance of the flanges of the beams 26a and 26b. This thrust is of course ultimately absorbed by the connecting beams 28.

If it is considered undesirable to submit the beams 26a and 26b to the combined loading of the vertically reacting end supports and the laterally reacting heel struts, separate thrust beams 30a and 30b may be secured at their ends to the columns 27a and 27b, respectively, below the beams 26a and 26b, as illustrated in Fig. 14, whereby the beams 26a and 26b will carry the vertical loads, and the beams 30a and 30b will carry the thrust loads. Both the vertical and thrust loads, however, in the arrangement illustrated in Fig. 14 are ultimately absorbed by the main frame of the building.

For applying only vertical loads to the main frame of the building, the novel arrangement illustrated in Figs. 15 and 16 may be utilized.

In this arrangement thrust beams 31a and 31b are secured to the lower ends of the heel struts 23, independently of the main structural frame 28, and the ends of the thrust beams 31a and 31b, are connected by tie beams 32c and 32d, and the tie beams consequently ultimately absorb all of the thrust of all of the lever arches.

Figs. 17 to 24, inclusive, illustrate another series of modified improved arches and beams and a modification of the improved method of making the same from standard rolled shapes.

The modification of the improved method of manufacturing arches and beams includes cutting a standard rolled shape 101, preferably an I beam, preferably in a length equal to or less than the clear distance between the bearings upon which the arch to be made is to be rested.

The web of the I beam is then longitudinally severed by a single curved scalloped cut 102, the curve of which follows the desired arch line, and the severing may be done by burning, shearing, slitting, or any other well known severing method.

Severing the shape 101 longitudinally, thus provides an arch 103, and a beam 104 each having a scalloped outer edge including outwardly protruding tongues T adapted for facilitating the welding of a chord reinforcing bar thereto, and for forming therewith, openings in the member through which wires for supporting metal lath may extend.

The arch 103 may be used to make an improved form of the lever arch of the type set forth in my aforesaid prior application, by securing as by arc welding spaced lever end supports 105 and 105' which may be angles, at each of the upper outer corners 106a and 106b of the bases 107a and 107b, respectively, of the arch 103, and the angle end supports are preferably located just below the upper flange 108 of the arch 103, and extend longitudinally beyond the ends of the bases any desired distance for resting upon and vertically reacting against the bearings for the arch.

Spaced thrust heel struts 106 and 106' are secured as by welding at the sides of each of the bases 107a and 107b and may depend downward from the lower outer corners of the arch any desired distance, the thrust heel struts being adapted as will hereinafter be set forth in greater detail, for abutment against any desired resistance against the end thrust of the arch, at any desired distance below the vertically reacting end supports.

The beam 104 made as aforesaid comprises a T beam of varying cross section having a maximum cross sectional area at the center and a scalloped curved outer edge.

The beam 104 may be used to make a floor joist having a flat upper chord and a curved lower chord, by reversing the position of the beam as illustrated in Fig. 17 to the position illustrated in Fig. 23, and by securing as by arc welding a curved lower chord reinforcing beam 109 to the downwardly protruding tongues T.

As illustrated, the scalloped curved cut 102 merges at its ends in outwardly extending cuts 102a and 102b parallel with the flanges 108 and 112 of the I beam, and the reinforcing chord bar 109 may extend in abutment with the outer edges formed by the parallel cuts 102a and 102b, and be secured thereto and form outwardly extending end supports 110a and 110b.

Figs. 25 to 28, inclusive, illustrate lever arches made partly by the improved method hereof, and which are adapted for resisting reverse or vibrating loads, that is to say transverse loads applied either downwardly as normally, or downwardly and upwardly due to the vibrations of machinery, earthquakes or the like.

In the lever arch illustrated in Figs. 25 and 26, one of the arches 3 is provided at its ends with improved end supports 140a and 140b. Each of the end supports 140a and 140b is in the form of a link frame comprising a plurality of sets of parallel members pivotally secured to each other at their intersections, and one of the members being secured to the thrust end of the arch, and each of the parallel members angular thereto extending beyond the other member of the other parallel set, to abut the upper and lower surfaces of the supporting beams for the joists.

In Figs. 27 and 28, modified arch 3' has its lower curved edge formed by the cut 2 terminating at the lower flange 12 some distance within the outer extremities of the I beam from which the arch is made, thereby providing at each end of the arch, end supports formed by the portions of the flange 12 remaining on the arch.

The end supports may be seated upon bearings formed by the upper surface of the lower flanges of bearing beams, and lower transversely extending angles 51a and 51b are secured to the remaining portions of the flange 12 adjacent each of the extremities of the arch, and are adapted for lateral abutment against the inner side faces of the lower flanges of the bearing beams, and laterally extending angles 52a and 52b are secured to the upper flange 8 of the arch adjacent the outer extremities thereof, and are adapted for lateral abutment against the inner side faces of the upper flanges of the bearing beams.

The distance between the flanges 8 and 12 may be sufficient to fill the space between the flanges of the bearing beams, or filler plates 53a and 53b may be provided between the flange 8 and the inner surface of the upper flanges of the bearing beam.

Accordingly each of the lever arches illustrated in Figs. 25 to 28 inclusive may resist transverse loads applied either upwardly or downwardly.

Modifications of the improved method herein illustrated and described, but not claimed, and various embodiments of the improved arches and beams, and arrangements thereof with the main structural frames of buildings, herein illustrated and described but not claimed, will be claimed in divisional applications hereof.

I claim:

1. A structural member including an arch having outer bases, end supports on the arch for carrying the entire vertical load of the arch and extending outwardly longitudinally therefrom, and means on the arch for abutment against members separate from and external of the arch for resisting the entire end thrust thereof.

2. A structural member including an arch having outer bases, end supports on the arch for carrying the entire vertical load of the arch and extending outwardly longitudinally therefrom, and means on the arch below the end supports for abutment against members separate from and external of the arch for resisting the entire end thrust thereof.

3. A structure including spaced supporting beams and a transverse load carrying member extending between the beams, the transverse load carrying member including an arch having outer bases, end supports carrying the entire vertical load of the arch and extending longitudinally outwardly from the bases thereof and each end support resting on one of the supporting beams, and thrust transmitting means below the end supports on the arch bases, the thrust transmitting means abutting against the supporting beams.

4. A structure including spaced supporting beams, a separate thrust resisting frame, and a plurality of transverse load carrying members extending between the beams, each transverse load carrying member including an arch having outer bases, end supports carrying the entire vertical load of the arch and extending longitudinally outwardly from the bases thereof and each end support resting on one of the supporting beams, and thrust transmitting means below the end supports on the arch bases, and the thrust transmitting means of all of the transverse load carrying members reacting against the thrust resisting frame.

5. A structure including spaced supporting beams, thrust resisting beams, and a plurality of transverse load carrying members extending between the beams, each transverse load carrying member including an arch having outer bases, end supports carrying the entire vertical load of the arch and extending longitudinally outwardly from the bases thereof and each end support resting on one of the supporting beams, and thrust transmitting means below the end supports on the arch bases, and the thrust transmitting means of all of the transverse load carrying members reacting against the thrust resisting beams.

6. A structure including spaced supporting beams, a separate thrust resisting frame, and a plurality of transverse load carrying members extending between the beams, the thrust resisting frame including spaced beams and tension means connecting the beams, each transverse load carrying member including an arch having outer bases, end supports carrying the entire vertical load of the arch and extending longitudinally outwardly from the bases thereof and each end support resting on one of the supporting beams, thrust transmitting means below the end supports on the arch bases, and the thrust transmitting means of all of the transverse load carrying members reacting against the beams of the thrust resisting frame.

In testimony that I claim the above, I have hereunto subscribed my name.

HURXTHAL F. FREASE.